United States Patent
Hasegawa

(10) Patent No.: US 8,698,443 B2
(45) Date of Patent: Apr. 15, 2014

(54) STEPPING MOTOR CONTROL CIRCUIT AND ANALOG ELECTRONIC TIMEPIECE

(75) Inventor: Takanori Hasegawa, Chiba (JP)

(73) Assignee: Seiko Instruments Inc. (JP)

( * ) Notice: Subject to any disclaimer, the term of this patent is extended or adjusted under 35 U.S.C. 154(b) by 569 days.

(21) Appl. No.: 13/065,664

(22) Filed: Mar. 25, 2011

(65) Prior Publication Data
US 2011/0235472 A1  Sep. 29, 2011

(30) Foreign Application Priority Data
Mar. 25, 2010 (JP) .................. 2010-071070

(51) Int. Cl.
*G05B 19/40* (2006.01)
(52) U.S. Cl.
USPC .......... 318/685; 318/696; 318/466; 368/76; 368/80; 368/112
(58) Field of Classification Search
USPC .............. 318/685, 696, 466; 368/76, 80, 112
See application file for complete search history.

(56) References Cited

U.S. PATENT DOCUMENTS

| 8,319,468 B2 * | 11/2012 | Manaka et al. ............... 318/685 |
| 2002/0180396 A1 | 12/2002 | Yamaya ........................ 318/685 |
| 2004/0178762 A1 | 9/2004 | Manaka ........................ 318/685 |
| 2008/0089183 A1 | 4/2008 | Manaka et al. ............... 368/202 |
| 2011/0080132 A1 * | 4/2011 | Ogasawara et al. ........... 318/696 |
| 2011/0122733 A1 * | 5/2011 | Honmura et al. ............... 368/80 |

OTHER PUBLICATIONS

Abstract, publication No. JP61015385, publication date Apr. 23, 1986.
Abstract, publication No. JP58068684, publication date Apr. 23, 1983.

* cited by examiner

*Primary Examiner* — Erick Glass
(74) *Attorney, Agent, or Firm* — Adams & Wilks

(57) ABSTRACT

A stepping motor control circuit and an analog electronic timepiece which can detect a rotation state including intermediate stopping more accurately are provided. A rotation detection circuit, in detecting whether or not an induction signal generated by the rotation of a stepping motor exceeds a predetermined reference threshold voltage during a detection period having a plurality of sections, detects whether or not the induction signal with inverted polarity exceeds a predetermined reference threshold voltage during a predetermined section, and a control unit immediately performs a drive control of the stepping motor with a correction drive pulse when it is determined that there is a sign of intermediate stopping of the stepping motor based on a result of detection by the rotation detection circuit.

20 Claims, 5 Drawing Sheets

FIG. 3

| STATE | ROTATIONAL BEHAVIOR | VRs OUTPUT TIMING |
|---|---|---|
| (i) NORMAL LOAD | | T1, T2, T3; P1; Vcomp; b, c |
| (ii) SMALL LOAD INCREASE | | T1, T2, T3; P1; Vcomp; a, b, c |

FIG. 4

| STATE | ROTATIONAL BEHAVIOR | VRs OUTPUT TIMING |
|---|---|---|
| (i) NORMAL LOAD | | T1, T2a, T2b, T3; P1; Vcomp2, Vcomp; b, c |
| (ii) SMALL LOAD INCREASE | | T1, T2a, T2b, T3; P1; Vcomp2, Vcomp; a, b, c |

⇩ LOAD INCREASE

| | | |
|---|---|---|
| (iii) INTERMEDIATE STOPPING | | T1, T2a, T2b, T3; P1, P2; Vcomp2, Vcomp; a |
| (iv) NON-ROTATION | | T1, T2a, T2b, T3; P1, P2; Vcomp2, Vcomp; a, d, e |

FIG. 5

| ROTATION DETECTION | | | | RANK OPERATION | | |
|---|---|---|---|---|---|---|
| T1 | T2 | T3 | DETERMINATION | DECISION | P1 | P2 |
| 0 | 1 | 1/0 | NORMAL LOAD | DOWN | -1 RANK | NON-PRESENCE |
| 1 | 1 | 1/0 | SMALL LOAD INCREASE | MAINTAIN | 0 | NON-PRESENCE |
| 1/0 | 0 | 1 | LARGE LOAD INCREASE | UP | +1 RANK | NON-PRESENCE |
| 1/0 | 0 | 0 | NON-ROTATION | P2+UP | +1 RANK | PRESENCE |

FIG. 6

| ROTATION DETECTION | | | | | RANK OPERATION | | |
|---|---|---|---|---|---|---|---|
| T1 | T2a | T2b | T3 | DETERMINATION | DECISION | P1 | P2 |
| Vcomp | Vcomp2 | Vcomp | Vcomp | | | | |
| 0 | 1 | 1 | 1/0 | NORMAL LOAD | DOWN | -1 RANK | NON-PRESENCE |
| 1 | 1 | 1 | 1/0 | SMALL LOAD INCREASE | MAINTAIN | 0 | NON-PRESENCE |
| 1/0 | 1 | 0 | 1 | LARGE LOAD INCREASE | UP | +1 RANK | NON-PRESENCE |
| 1/0 | 1 | 0 | 0 | NON-ROTATION | P2+UP | +1 RANK | PRESENCE |
| 1/0 | 0 | 1/0 | 1/0 | INTERMEDIATE STOPPING | IMMEDIATE P2+UP | +1 RANK | IMMEDIATE PRESENCE |

STEPPING MOTOR CONTROL CIRCUIT AND ANALOG ELECTRONIC TIMEPIECE

BACKGROUND OF THE INVENTION

1. Field of the Invention

The present invention relates to a stepping motor control circuit and an analog electronic timepiece which uses the stepping motor control circuit.

2. Background Art

Conventionally, a stepping motor having the following constitution has been used in an analogue electronic timepiece or the like. The stepping motor includes a stator which has a rotor accommodating hole and a positioning part for deciding a stop position of a rotor, the rotor which is arranged in the rotor accommodating hole, and a coil, wherein an AC signal is supplied to the coil so that a magnetic flux is generated in the stator thus rotating the rotor, and the rotor is stopped at a position corresponding to the positioning part.

Conventionally, as a method of controlling the above-mentioned stepping motor, a following correction drive method has been adopted (see JP-B-61-15385 (patent document 1)). In driving a stepping motor with a main drive pulse, whether the rotor is rotated or not is detected by detecting an induction signal generated in the stepping motor, and the stepping motor is driven by changing the main drive pulse to a main drive pulse having a different pulse width or by forcibly rotating the stepping motor with a correction drive pulse having a larger pulse width than the main drive pulse corresponding to the result of detection of whether or not the rotor is rotated.

WO2005/119377 (patent document 2) discloses a method of controlling a stepping motor in which, in addition to the detection of an induction signal in the same manner as patent document 1, energy of a main drive pulse is made small when a detection time of the induction signal is earlier than a reference time and energy of the main drive pulse is made large when the detection time of the induction signal is later than the reference time so that the stepping motor is rotatably driven with the main drive pulse corresponding to a load at the time of driving the stepping motor whereby a consumption current is lowered. Due to such a constitution, the method enables a more accurate pulse control.

However, when the stepping motor is driven with a main drive pulse having a small drive force, there may be a case where the energy of the main drive pulse is small so that the energy balances with a load whereby a rotor is stopped at a middle position where the rotor is not rotated by 180° (intermediate stopping). Accordingly, the techniques disclosed in patent documents 1, 2 cannot cope with drawbacks relating to the intermediate stopping.

On the other hand, JP-A-58-68684 (patent document 3) discloses the invention in which an intermediate stopping state is detected in response to an induction signal generated by the rotation of a rotor. However, the invention adopts the constitution where the intermediate stopping is detected by making use of the finding that an induction signal in the forward direction is not generated in the intermediate stopping state and hence, there exists a drawback that the detection accuracy is poor.

JP-A-2004-260875 (patent document 4) and JP-A-2002-354893 (patent document 5) disclose the inventions where an induction signal which is generated by the rotation of a rotor is detected by another detection resistance. However, these inventions aim at the prevention of detection of an induction signal during a mask period and hence, these inventions are irrelevant to the solution of drawbacks on intermediate stopping.

SUMMARY OF THE INVENTION

It is an aspect of the present application to realize the more accurate detection of a rotation state including intermediate stopping in a control of a stepping motor.

According to the aspect of the present application, there is provided a stepping motor control circuit which includes: a rotation detecting unit which detects whether or not an induction signal which is generated due to the rotation of a rotor of a stepping motor exceeds a predetermined reference threshold voltage in a detection section having a plurality of sections; and a control unit which determines a rotation state of the stepping motor based on the section in which the induction signal which exceeds the reference threshold voltage is detected, and performs a drive control of the stepping motor based on a result of the determination, wherein the rotation detecting unit, at the time of detecting whether or not the induction signal exceeds the reference threshold voltage, detects whether or not the induction signal exceeds the reference threshold voltage in a predetermined section by inversing polarity of the induction signal, and the control unit determines the rotation state of the stepping motor based on a result of detection by the rotation detecting unit, and performs, based on a result of determination, the drive control of the stepping motor with any one of a plurality of main drive pulses which differ from each other in energy or a correction drive pulse having larger energy than the respective main drive pulses.

Further, according to another aspect of the present application, there is provided an analog electronic timepiece which includes: a stepping motor which rotatably drives a time hand; and a stepping motor control circuit which controls the stepping motor, wherein the previously-mentioned stepping motor control circuit is used as the stepping motor control circuit.

According to the stepping motor control circuit of the present application, a rotation state including intermediate stopping can be detected more accurately.

Further, according to the analogue electronic timepiece of the present application, a rotation state including intermediate stopping can be detected more accurately so that an accurate hand moving operation can be acquired.

BRIEF DESCRIPTION OF THE DRAWINGS

FIG. 3 is a timing chart for explaining an operation which becomes a premise in the stepping motor control circuit and the analog electronic timepiece according to the embodiment of the present invention;

FIG. 4 is a timing chart of the stepping motor control circuit and the analog electronic timepiece according to the embodiment of the present invention;

FIG. 5 is a determination chart for explaining an operation which becomes a premise in the stepping motor control circuit and the analog electronic timepiece according to the embodiment of the present invention;

FIG. 6 is a determination chart for the stepping motor control circuit and the analog electronic timepiece according to the embodiment of the present invention;

DESCRIPTION OF THE PREFERRED EMBODIMENT

Figure 1:
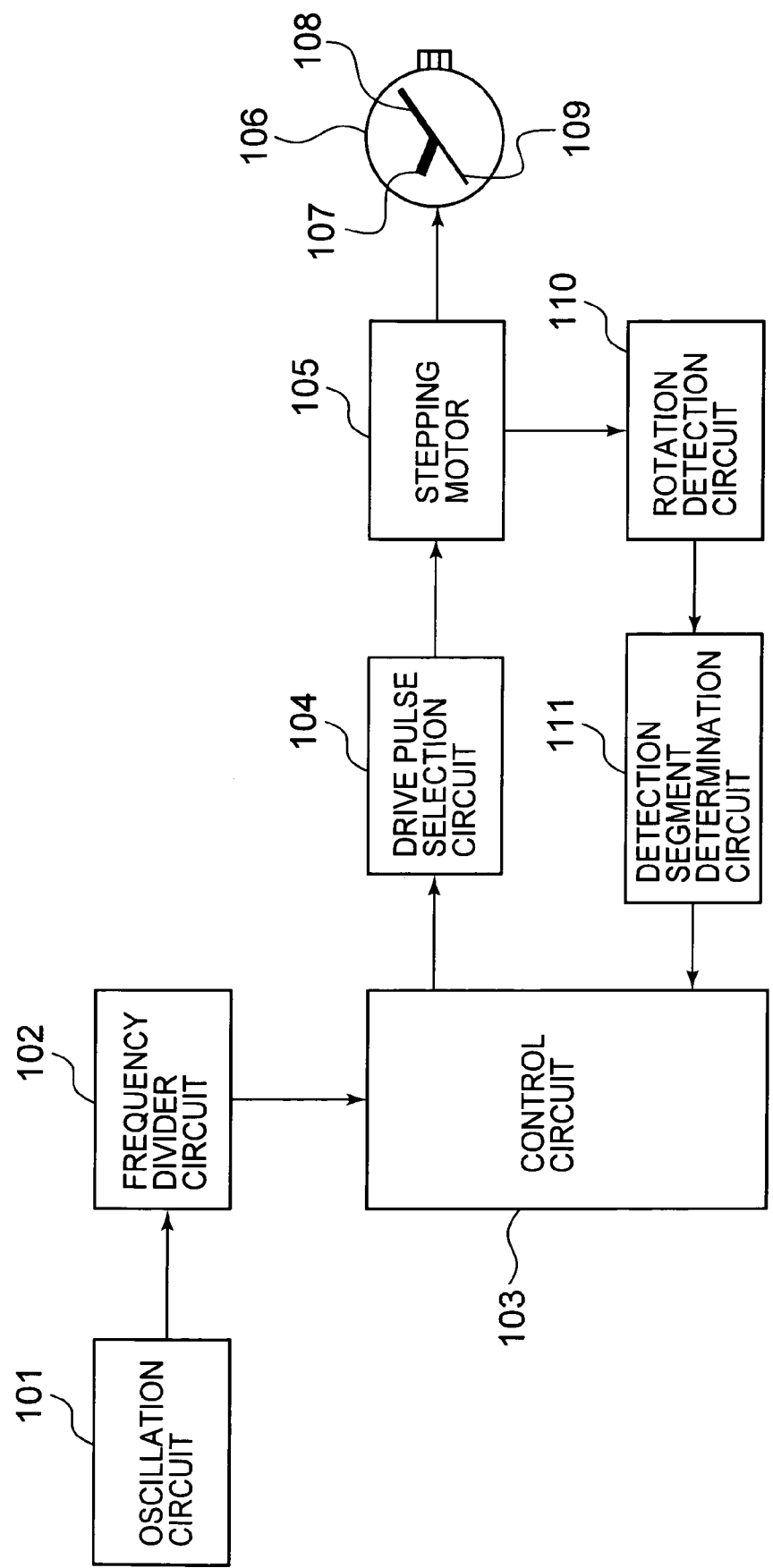
FIG. 1 is a block diagram of an analog electronic timepiece according to an embodiment of the present invention.

FIG. 1 is a block diagram of an analogue electronic timepiece which uses a stepping motor control circuit according to an embodiment of the present invention, wherein an analogue electronic wristwatch is shown as an example of the analogue electronic timepiece.

In FIG. 1, the analogue electronic timepiece includes an oscillation circuit 101 which generates a signal of predetermined frequency, a frequency dividing circuit 102 which generates a clock signal which becomes the reference in counting times by dividing the frequency of the signal generated by the oscillation circuit 101, a control circuit 103 which performs various controls such as a control of respective electronic circuit elements which constitute an electronic timepiece and a pulse control such as changing of a drive pulse, a drive pulse selection circuit 104 which selects and outputs a drive pulse for rotational driving of a motor based on a control signal from the control circuit 103, a stepping motor 105 which is rotatably driven with a drive pulse from the drive pulse selection circuit 104, and an analogue display part 106 having hands (three kinds of hands consisting of a hour hand 107, a minute hand 108 and a second hand 109 in the example shown in FIG. 1) which are rotatably driven by the stepping motor 105 for displaying time.

Further, the analogue electronic timepiece includes a rotation detection circuit 110 which detects an induction signal VRs which exceeds a predetermined reference voltage Vcomp out of induction signals VRs generated by rotation free vibrations of the stepping motor 105 during a predetermined detection section, and a detection time determination circuit 111 which, by comparing a point of time that an induction signal VRs which exceeds the reference threshold voltage Vcomp is detected by the rotation detection circuit 110 with a section during which the induction signal VRs is detected, determines the section during which the induction signal VRs is detected. As described later, in this embodiment, the detection section during which a rotation state of the stepping motor 105 is detected is divided into a plurality of sections.

The rotation detection circuit 110 has the substantially same constitution as a rotation detection circuit disclosed in the patent document 1. the reference threshold voltage Vcomp is set as follows. That is, when a rotor is rotated at a constant high speed such as in the case where the stepping motor 105 is rotated or the like, the rotation detection circuit 110 detects an induction signal VRs which exceeds the predetermined reference threshold voltage Vcomp. On the other hand, when the rotor is not rotated at a constant high speed as in the case where the stepping motor 105 is not rotated or the like, the induction signal VRs does not exceed the reference threshold voltage Vcomp.

The frequency dividing circuit 102 outputs a clock signal which becomes the reference for counting time by dividing a signal having a predetermined frequency which is generated by the oscillation circuit 101. The control circuit 103 counts a current time based on the clock signal and outputs a control signal to the drive pulse selection circuit 104 at a predetermined cycle. The drive pulse selection circuit 104, in response to a control signal from the control circuit 103, rotationally drives the stepping motor 105 with a drive pulse corresponding to the control signal. The stepping motor 105 rotatably drives the time hands 107 to 109 of the analog display part 106 so that a current time is always displayed.

The rotation detection circuit 110 detects an induction signal VRs which exceeds a reference threshold voltage Vcomp which is generated by the stepping motor 105, and the detection time determination circuit 111 determines which section the induction signal VRs belongs. The control circuit 103, based on a pattern expressing a section to which an induction signal VRs acquired by the detection time determination circuit 111 belongs, determines a rotation state including a residual driving force and intermediate stopping of the stepping motor 105, and performs a pulse control by the pulse-up or the pulse-down of a main drive pulse P1 or by outputting a control signal to the drive pulse selection circuit 104 such that the stepping motor 5 is driven with a correction drive pulse P2. The drive pulse selection circuit 104 rotatably drives the stepping motor 105 with a drive pulse corresponding to the control signal.

Here, the oscillation circuit 101 and the frequency dividing circuit 102 constitute a signal generation unit, and the analog display part 106 constitutes a time display unit. The rotation detection circuit 110 constitutes a rotation detection unit, while the control circuit 103, the drive pulse selection circuit 104 and the detection time determination circuit 111 constitute a control unit.

Figure 2:
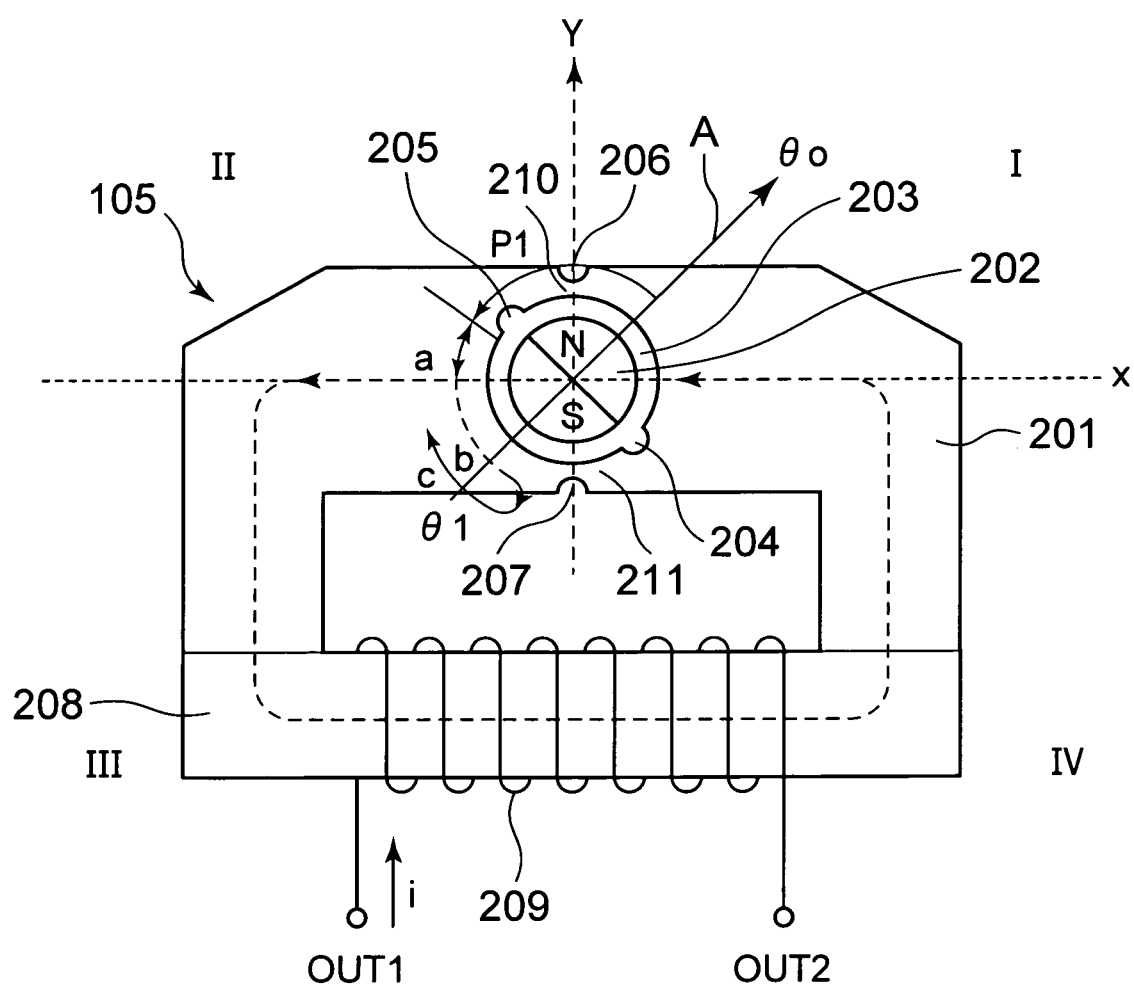
FIG. 2 is a constitutional view of a stepping motor which is used in the analog electronic timepiece according to the embodiment of the present invention.

FIG. 2 is a constitutional view of the stepping motor used in the embodiment of the present invention, and shows a timepiece-use stepping motor used in general as an analogue electronic timepiece as an example.

In FIG. 2, the stepping motor 105 includes a stator 201 having a rotor accommodating through hole 203, a rotor 202 which is rotatably arranged in the rotor accommodating through hole 203, a magnetic core 208 which is joined to the stator 201, and a coil 209 wound around the magnetic core 208. In using the stepping motor 105 in an analogue electronic timepiece, the stator 201 and the magnetic core 208 are fixed to a ground plate (not shown in the drawing) and are joined to each other by bolts (not shown in the drawing). The coil 201 includes a first terminal OUT1 and a second terminal OUT2.

The rotor 202 is magnetized to two poles (S pole and N pole). On an outer end portion of the stator 201 formed using a magnetic material, a plurality of (two in this embodiment) notched portions (outer notches) 206, 207 are formed at positions which face each other in an opposed manner with the rotor accommodating through hole 203 sandwiched therebetween. Saturable portions 210, 211 are provided between the respective outer notches 206, 207 and the rotor accommodating through hole 203.

The saturable portions 210, 211 are not magnetically saturated with a magnetic flux of the rotor 202, and are magnetically saturated when the coil 209 is excited so as to increase the magnetic resistance. The rotor accommodating through hole 203 is formed into a circular hole shape where a plurality of (two in this embodiment) semicircular notched portions (inner notches) 204, 205 are integrally formed with a through hole having a circular profile at opposed positions.

The notched portions 204, 205 constitute positioning portions for deciding stop positions of the rotor 202. In a state where the coil 209 is not excited, as shown in FIG. 2, the rotor 202 is stably stopped at a position corresponding to the positioning portion. In other words, the rotor 202 is stably stopped at a position where a magnetic pole axis A of the rotor 202 becomes orthogonal to a line segment which connects the notched portions 204, 205 (at a position of angle θ0). An XY coordinate space about a rotational axis (center of rotation) of the rotor 202 is divided into four quadrants (first quadrant I to fourth quadrant IV).

When a drive pulse of one polarity having a rectangular waveform is supplied between the terminals OUT1, OUT2 of the coil 209 from the drive pulse selection circuit 104 (for example, setting a first terminal OUT1 side as a positive pole, and a second terminal OUT2 side as a negative pole) thus allowing an electric current i to flow in the direction indicated by an arrow shown in FIG. 2, a magnetic flux is generated in the stator 201 in the direction indicated by a broken-line arrow. Accordingly, the saturable portions 210, 211 are saturated so that the magnetic resistance is increased. Thereafter, due to an interaction between a magnetic pole generated in the stator 201 and a magnetic pole of the rotor 202, the rotor 202 is rotated in the direction indicated by an arrow in FIG. 2 by 180 degrees, and is stably stopped at a position where the magnetic pole axis A assumes an angle θ1. Here, assume the rotational direction (counterclockwise direction in FIG. 2) along which a normal operation (hand moving operation in this embodiment since the analogue electronic timepiece is used) is performed by rotatably driving the stepping motor 105 as the normal direction, and assume the direction opposite to such rotational direction (clockwise direction) as a backward direction.

Next, when a drive pulse of inverse polarity having a rectangular waveform is supplied to the terminals OUT1, OUT2 of the coil 209 from the drive pulse selection circuit 104 (setting the first terminal OUT1 side as a negative pole, and the second terminal OUT2 side as a positive pole opposite to the polarity relationship of the above-mentioned driving) thus allowing an electric current to flow in the direction opposite to the direction indicated by the arrow shown in FIG. 2, a magnetic flux is generated in the stator 201 in the direction opposite to the direction indicated by the broken-line arrow. Accordingly, the saturable portions 210, 211 are firstly saturated and, thereafter, due to an interaction between a magnetic pole generated in the stator 201 and a magnetic pole of the rotor 202, the rotor 202 is rotated in the same direction as the above-mentioned direction by 180 degrees, and is stably stopped at a position where the magnetic pole axis A assumes an angle θ0.

Hereinafter, with the supply of signals which differ in polarity (alternating signals) to the coil 209, the above-mentioned operations are repeatedly performed so that the rotor 202 can be rotated continuously in the direction indicated by the arrow for every 180 degrees. In this embodiment, as the drive pulses, a plurality of main drive pulses P10 to P1$m$ which differ from each other in energy and a correction drive pulse P2 are used. The rank n of the main drive pulse P1$n$ has a plurality of ranks ranging from a minimum value 0 to a maximum value m, where the larger the value of n, the larger the energy of a pulse becomes (the longer a pulse width of a rectangular waveform becomes in this embodiment). The correction drive pulse P2 is a large energy pulse which can rotatably drive an excessively large load and the energy of the correction drive pulse P2 is set approximately 10 times as large as the energy of the main drive pulse P1.

FIG. 3 is a timing chart for explaining an operation which becomes a premise of the embodiment of the present invention. FIG. 3 shows a case where a load is a normal load and a case where the load is a load with a small increase. Here, the normal load means a load which is driven in a normal state, and a load applied when hands 107 to 109 are driven is referred to as the normal load in this embodiment. On the other hand, the load with a small increase means a load in a state where a small predetermined load is increased from a state of the normal load.

As shown in FIG. 3, as described previously, Vcomp is a reference threshold voltage for determining a voltage level of an induction signal VRs generated by free vibrations of the stepping motor 105.

A detection section T is divided into a plurality of sections (three sections consisting of a first section T1 which is a predetermined time immediately after driving with the main drive pulse P1, a second section T2 which is a predetermined time and comes after the first section T1 and a third section T3 which is a predetermined time and comes after the second section T2).

A rotation state such as a remaining driving force or the presence or non-presence of rotation is detected based on a combination pattern of induction signals VRs of same polarity which are generated in the respective sections T1 to T3. Here, a mask period in which an induction signal VRs is not detected is not provided.

Here, "immediately after driving with the main drive pulse P1" means "immediately at a point of time that the rotation of the stepping motor can be detected substantially" and indicates a point of time that the rotation of the stepping motor can be detected after the lapse of a predetermined time in a sampling cycle (for example, approximately 0.9 msec) where sampling processing for detecting the rotation is not possible after finishing of driving with the main drive pulse P1 or a point of time that a predetermined time in which an induction voltage which is generated due to the finishing of driving per se with the main drive pulse P1 influences the detection of rotation lapses.

For example, when the increase of the load is small ((ii) shown in FIG. 3), and when a region where the rotor 202 is driven by the main drive pulse P1 is expressed as P1, an induction signal VRs which is generated in a region a is detected in the first section T1, an induction signal VRs which is generated in a region c is detected in the sections T2, T3 (a drive energy margin when detected in the second section T2 being larger than a drive energy margin when detected in the third section T3). An induction signal VRs which is generated in a region b straddles the sections T1, T2 and is detected with negative polarity.

That is, an induction signal VRs is generated due to free vibrations of the rotor 202 after the drive pulse P1 is cut. Accordingly, the generation of such an induction signal VRs is characterized in that timing at which the induction signal VRs induced in the first section T1 is generated is limited to a range from rotation driving with no margin (a substantially stopped state) to a region with a certain amount of remaining driving force, and the induction signal VRs is not generated when a rotational force is sufficient (corresponding to the region a in FIG. 2 and FIG. 3).

When the remaining driving force is sufficient, the drive pulse is cut in the region b and hence, the induction signal VRs is outputted with an opposite phase. A height of the induction signal VRs detected in the first section T1 is inversely proportional to the decrease of remaining driving force due to the motion of the rotor 202. The degree of remaining driving force of the drive pulse energy can be determined by making use of such a nature of the induction signal VRs.

Based on the finding of such features, the above-mentioned detection section which starts immediately after driving with a main drive pulse P1 is divided into a plurality of sections consisting of three or more sections, and the rotation detection circuit 110 controls the main drive pulse P1 corresponding to a section in which an induction signal VRs which exceeds the reference threshold voltage Vcomp is detected. For example, when an induction signal VRs which exceeds the reference threshold voltage Vcomp is generated in the first section T1, it is determined that the remaining rotation force is decreased and the main drive pulse P1 is maintained without being changed to the main drive pulse P1 with small energy thus preventing the change of the main drive pulse P1 into the main drive pulse P1 with small energy.

FIG. 5 is a determination chart for explaining operations which become a premise of the embodiment of the present invention, and shows the pulse control in a comprehensive manner. A determination value of each section is expressed such that a case where the induction signal VRs which exceeds the reference threshold voltage Vcomp is detected in the section is expressed as "1", a case where the induction signal VRs which exceeds the reference threshold voltage Vcomp is not detected in the section is expressed as "0". Further, a case where both of the case where the induction signal VRs which exceeds the reference threshold voltage Vcomp is detected in the section is expressed and the case where the induction signal VRs which exceeds the reference threshold voltage Vcomp is not detected in the section serve the purpose is expressed as "1/0". A rotation state such as a remaining drive force is determined based on a pattern of determination values of the induction signals VRs detected in the respective sections (first section, second section and third section), and a pulse control such as rank-down (pulse-down), maintaining, rank-up (pulse-up) of an energy rank of the main drive pulse P1, driving with a correction drive pulse P2 or the like is performed based on a result of the determination.

For example, as shown in FIG. 3 and FIG. 5, when the induction signal VRs which exceeds the reference threshold voltage Vcomp is detected at least in the first section T1 and in the second section T2 (pattern being (1, 1, 1/0)), the main drive pulse P1 is not changed (a small load increased state where a rank-maintain pulse control is performed).

The pattern (0, 1, 1/0) indicates a normal load state. In this case, it is determined that there is a remaining driving force so that the rank of the main drive pulse P1 is downed by 1.

The pattern (1/0, 0, 1) indicates a large load increase state. In this case, it is determined that there is no remaining driving force and energy is in short in the main drive pulse P1 so that the main drive pulse P1 is ranked up by 1 without performing driving of the stepping motor 105 with a correction drive pulse P2.

The pattern (1/0, 0, 0) indicates a state (non-rotation) where the stepping motor 105 is not rotated. In this case, it is determined that there is completely no remaining driving force and energy is in short in the main drive pulse P1 so that the stepping motor 105 is forcibly driven with the correction drive pulse P2 and, thereafter, the main drive pulse P1 is ranked up by 1.

By dividing the detection section T into a plurality of sections and by determining a rotation state such as a remaining drive force or the like based on the pattern of determination values of the induction signal VRs, it is possible to perform the more accurate pulse control. As described hereinafter, however, in this embodiment, it is possible to realize the more proper pulse control by further detecting a sign or a symptom of intermediate stopping.

FIG. 4 is a timing chart of the embodiment of the present invention, and FIG. 6 is a determination chart of the embodiment of the present invention. The control circuit 103 stores the determination chart shown in FIG. 6 in a storage unit built in the inside of the control circuit 103, and determines a rotation state using the determination chart and performs a pulse control.

On the premise of the timing shown in FIG. 3 and the determination chart shown in FIG. 5, in the embodiment of the present invention, the second section T2 is divided into a plurality of (two in this embodiment) small sections T2a, T2b, and in the section T2a which constitutes a front portion of the second section T2, in detecting whether or not the induction signal VRs exceeds the reference threshold voltage, the rotation detection circuit 110 detects whether or not the induction signal VRs exceeds the reference threshold voltage by inversing the polarity of the induction signal VRs. The control circuit 103 determines a rotation state such as the degree of remaining driving force, the intermediate stopping and the like based on a pattern of determination values of the sections T1, T2a, T2b, T3 and performs a pulse control based on a result of the determination.

As the reference threshold voltage, a reference threshold voltage Vcomp2 for detecting a sign of intermediate stopping is used together with the reference threshold voltage Vcomp for detecting whether or not the stepping motor 105 is rotated. The reference threshold voltage Vcomp2 is set to a voltage smaller than the reference threshold voltage Vcomp.

The rotation detection circuit 110 detects the presence or the non-presence of an induction signal VRs which exceeds the reference threshold voltage Vcomp using the reference threshold voltage Vcomp in the sections T1, T2b and T3, and the control circuit 103 determines the degree of a remaining driving force or whether or not the stepping motor 105 is rotated based on a pattern of determination values in the section T1, the section T2b and the section T3 (determination value in the section T1, the determination value in the section T2 and the determination value in the section T3), and performs a pulse control based on a result of the determination.

Further, the rotation detection circuit 110 detects the presence or the non-presence of an induction signal VRs with inverted polarity which exceeds the reference threshold voltage Vcomp2 using the reference threshold voltage Vcomp2 in the section T2a. The control circuit 103 determines that the rotor 202 is vibrated so that intermediate stopping is not recognized when the induction signal VRs with inverted polarity in the section T2a exceeds the reference threshold voltage Vcomp2, and determines that there is a sign of intermediate stopping when the induction signal VRs with inverted polarity in the section T2a does not exceeds the reference threshold voltage Vcomp2, and performs a pulse control based on a result of the determination.

For example, in the case of a normal load, as the pattern (the determination value of the first section T1, the determination value of the second small section T2a, the determination value of the second small section T2b, the determination value of the third section T3), (0, 1, 1, 1/0) is obtained. The determination value of the second small section T2a is "1" and hence, the intermediate stopping is not recognized. Further, the pattern (the determination value of the first section T1, the determination value of the second small section T2b, the determination value of the third section T3) is (0, 1, 1/0) and hence, it is determined that there is a remaining drive force and the rank of the main drive pulse P1 is downed by 1.

On the other hand, in case of the intermediate stopping (FIG. 4 (iii)), the determination value of the second small section T2a is "0" and hence, the control circuit 103 determines this pattern as a sign of the intermediate stopping and immediately forcibly rotates the stepping motor 105 with the correction drive pulse P2 and, thereafter, raises the rank of the energy of the main drive pulse P1 by 1. Due to such an operation, it is possible to prevent the stepping motor 105 from being stopped in an intermediate stopping state.

Figure 7:
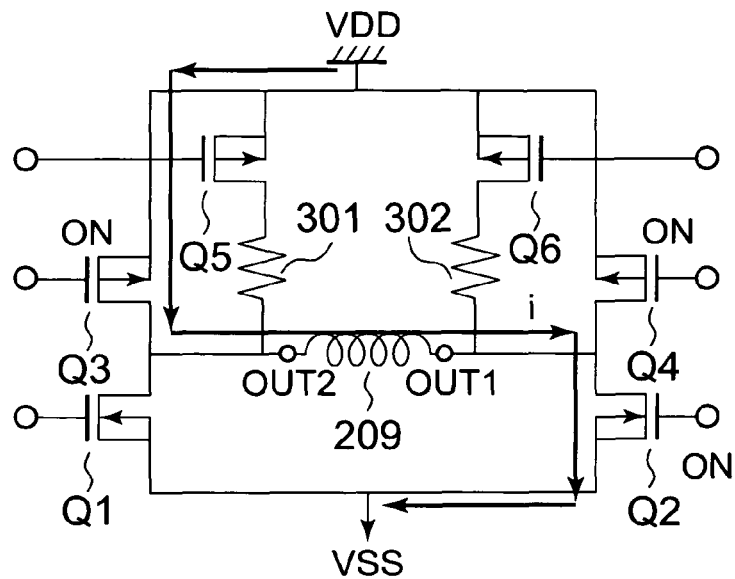
FIG. 7 is a circuit diagram with a part described in detail for explaining an operation of the stepping motor control circuit and the analog electronic timepiece according to the embodiment of the present invention.
Figure 8:
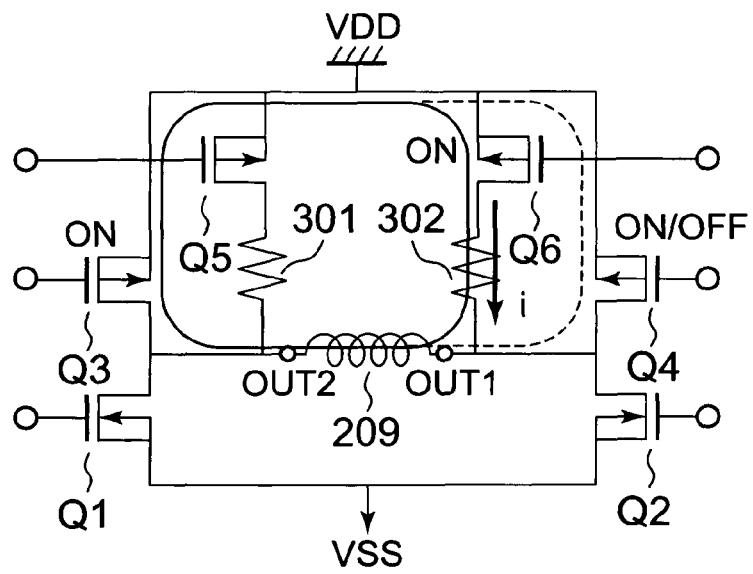
FIG. 8 is a circuit diagram with a part described in detail for explaining an operation of the stepping motor control circuit and the analog electronic timepiece according to the embodiment of the present invention.
Figure 9:
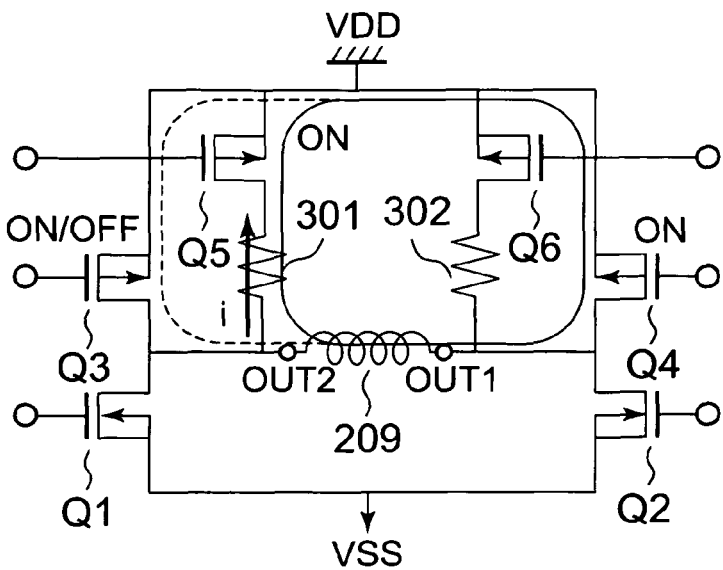
FIG. 9 is a circuit diagram with a part described in detail for explaining an operation of the stepping motor control circuit and the analog electronic timepiece according to the embodiment of the present invention.

FIG. 7 to FIG. 9 are circuit diagrams with a part described in detail of the drive pulse selection circuit 104 and the rotation detection circuit 110 respectively.

In FIG. 7 to FIG. 9, transistors Q1, Q2 are constitutional elements of the drive pulse selection circuit 104, and the transistors Q5, Q6 and detection resistances 301, 302 are constitutional elements of the rotation detection circuit 110. Further, transistors Q3, Q4 are constitutional elements which are used in both the drive pulse selection circuit 104 and the rotation detection circuit 110. The detection resistances 301, 302 are elements having the same resistance value and constitute detection elements.

In rotatably driving the stepping motor 105 with a main drive pulse P1, as shown in FIG. 7, by turning on the transistors Q2, Q3 with the main drive pulse P1, a drive current i is supplied to the coil 209 of the stepping motor 105 in the direction indicated by an arrow. Accordingly, in the rotation of the stepping motor 105, the rotor 202 is rotated in the forward direction by 180 degrees.

As shown in FIG. 8, in the first section T1, the second small section T2b and the third section T3 of the detection section T immediately after the driving with the main drive pulse P1, the rotation detection circuit 110 detects an induction signal VRs generated in the detection resistance 302 by switching the transistor Q4 in a state where the transistors Q3, Q6 are turned on, and detects whether or not the induction signal VRs exceeds a predetermined reference threshold voltage Vcomp. In this embodiment, as described previously, in the predetermined section T2a, the rotation detection circuit 110 detects whether or not an induction signal VRs with inverted polarity exceeds the reference threshold voltage.

That is, as shown in FIG. 8, in the sections T1, T2b and T3, the rotation detection circuit 110 detects whether or not an induction signal VRs exceeds the reference threshold voltage Vcomp (first reference threshold voltage) as described above. On the other hand, in the second small section T2a, the rotation detection circuit 110, as shown in FIG. 9, by switching the transistor Q3 in a state where the transistors Q4, Q5 are in an ON state, detects an induction signal VRs generated in the detection resistance 301 (induction signal VRs with inverted polarity), and detects whether or not the induction signal VRs exceeds the predetermined reference threshold voltage Vcomp2 (second reference threshold voltage).

For example, in cases other than intermediate stopping such as a normal load state, a small load increased state and a non-rotation state ((i), (ii), (iv) in FIG. 4), in the section T2a, the induction signal VRs which exceeds the reference threshold voltage Vcomp2 although being an induction signal VRs of low level is detected. Accordingly, in a detection time determination circuit 111, as a determination value of the induction signal VRs in the section T2a, "1" is obtained.

However, in case of the intermediate stopping ((iii) in FIG. 4), the rotor 202 is not vibrated freely and hence, the induction signal VRs becomes a delicate voltage below the reference threshold voltage Vcomp2. Accordingly, in the detection time determination circuit 111, in the case of the intermediate stopping, as a determination value of the induction signal VRs in the section T2a, "0" is obtained.

When the control circuit 103 determines that the determination value of the second small section T2a is "0" in the pattern (the determination value of the first section T1, the determination value of the second small section T2a, the determination value of the second small section T2b and the determination value of the third section T3) based on the determination chart shown in FIG. 6 which is stored in the storage unit, the control circuit 103 immediately controls the drive pulse selection circuit 104 such that the stepping motor 105 is rotatably driven with the correction drive pulse P2. The drive pulse selection circuit 104 rotatably drives the stepping motor 105 in response to the control by the control circuit 103. Although the stepping motor 105 cannot be rotated once the stepping motor 105 is held in an intermediate stopping state in a stable manner, according to this embodiment, the stepping motor 105 is forcibly rotatably driven immediately after detecting a sign of intermediate stopping and hence, it is possible to prevent the stepping motor 105 from being held in an intermediate stopping state in a stable manner.

In the next cycle, in rotatably driving the stepping motor 105 with the main drive pulse P1, by turning on the transistors Q1, Q4 with the main drive pulse P1, a drive current i in the direction opposite to an arrow is supplied to the coil 209 of the stepping motor 105. Accordingly, the rotor 202 of the stepping motor 105 is further rotated in the forward direction by 180 degrees.

In the section T1, T2b and T3 of the detection section T immediately after the driving with the main drive pulse P1, as shown in FIG. 9, the rotation detection circuit 110 detects an induction signal VRs generated in the detection resistance 301 by switching the transistor Q3 in a state where the transistors Q4, Q5 are turned on, and detects whether or not the induction signal VRs exceeds a predetermined reference threshold voltage Vcomp. Also in this cycle, in the predetermined section T2a, the rotation detection circuit 110 detects whether or not an induction signal VRs with inverted polarity exceeds the reference threshold voltage Vcomp2 by inverting the polarity of the induction signal VRs.

That is, in the sections T1, T2b and T3, the rotation detection circuit 110 detects whether or not an induction signal VRs exceeds the reference threshold voltage Vcomp as described above. On the other hand, in the second small section T2a, the rotation detection circuit 110, as shown in FIG. 8, by switching the transistor Q4 in a state where the transistors Q3, Q6 are in an ON state, detects an induction signal VRs generated in the detection resistance 302, and detects whether or not the induction signal VRs with inverted polarity exceeds the predetermined reference threshold voltage Vcomp2.

The control circuit 103, in the same manner as the preceding cycle, determines a rotation state based on the pattern of determination values of the induction signal VRs and performs a pulse control based on a result of the determination. When the determination value of the section T2a in the pattern of the induction signal VRs is "0", the control circuit 103 determines the determination value as a sign of intermediate stopping, and immediately controls the drive pulse selection circuit 104 such that the stepping motor 105 is rotatably driven with a correction drive pulse P2. The drive pulse selection circuit 104 rotatably drives the stepping motor 105 in response to the control of the control circuit 103. In this manner, since the stepping motor 105 is forcibly rotatably driven immediately after detection of a sign of intermediate stopping, it is possible to prevent the stepping motor 105 from being held in an intermediate stopping state in a stable manner.

As has been explained heretofore, according to the stepping motor control circuit of this embodiment, it is possible to more accurately detect a rotation state including intermediate stopping. Particularly, the rotation detection circuit 110, in detecting whether or not the induction signal VRs generated by the rotation of the stepping motor 105 exceeds the predetermined reference threshold voltage during the detection period having a plurality of sections, detects whether or not the induction signal VRs with inverted polarity exceeds the predetermined reference threshold voltage during the predetermined period, and the control unit immediately performs the drive control of the stepping motor 105 with the correction drive pulse P2 when it is determined that there is a sign of intermediate stopping of the stepping motor 105 based on a result of detection by the rotation detection circuit 110. Accordingly, it is possible to prevent the stepping motor 105 from being held in an intermediate stopping state in a stable manner.

The intermediate stopping can be obviated even when the energy of the main drive pulse P1 is lowered and hence, it is possible to acquire the reliable rotational driving and the low power consumption, and when a battery is used as a power source, a lifetime of the battery can be prolonged.

According to an analogue electronic timepiece of the present invention, a rotation state including intermediate stopping can be detected more accurately and hence, it is possible to acquire an accurate hand movement, the low power consumption and the like.

In the above-mentioned embodiment, the explanation has been made with respect to the example where the detection section having three sections is divided into four sections. However, the detection section may be configured such that a predetermined section of a detection section which has two or more sections is divided into a plurality of small sections.

In the above-mentioned embodiment, a pulse width is changed for changing energy of each main drive pulse P1. However, the drive energy can be also changed by changing a pulse voltage or the like. Further, the drive energy of the main drive pulse P1 may be changed by forming the main drive pulse P1 into a comb-teeth chopping waveform and by changing the number of chopping or a duty ratio of the main drive pulse P1.

The present invention is also applicable to a stepping motor for driving a calendar or the like besides the time hands.

Although the explanation has been made with respect to the case where the stepping motor is applied to an electronic timepiece as an example of application, the stepping motor control circuit of the present invention is applicable to an electronic apparatus which uses a motor.

The stepping motor control circuit according to the present invention is applicable to various electronic apparatuses which use a stepping motor.

Further, the electronic timepiece according to the present invention is applicable to various analog electronic timepieces including various analog electronic timepieces with a calendar function such as an analog electronic wristwatch with a calendar function or an analog electronic clock with a calendar function.

What is claimed is:

1. A stepping motor control circuit comprising:
    a rotation detecting unit which detects whether or not an induction signal which is generated due to the rotation of a rotor of a stepping motor exceeds a predetermined reference threshold voltage in a detection section having a plurality of sections; and
    a control unit which determines a rotation state of the stepping motor based on the section in which the induction signal which exceeds the reference threshold voltage is detected, and performs a drive control of the stepping motor based on a result of the determination, wherein
    the rotation detecting unit, at the time of detecting whether or not the induction signal exceeds the reference threshold voltage, detects whether or not the induction signal exceeds the reference threshold voltage in a predetermined section by inversing polarity of the induction signal, and
    the control unit determines the rotation state of the stepping motor based on a result of detection by the rotation detecting unit, and performs, based on a result of determination, the drive control of the stepping motor with any one of a plurality of main drive pulses which differ from each other in energy or a correction drive pulse having larger energy than the respective main drive pulses.

2. A stepping motor control circuit according to claim 1, wherein the predetermined section out of the plurality of sections is divided into a plurality of small sections, and the rotation detecting unit inverses polarity of the induction signal and detects whether or not the induction signal exceeds the reference threshold voltage in the predetermined small section at the time of detecting whether or not the induction signal exceeds the reference threshold voltage.

3. A stepping motor control circuit according to claim 2, wherein the reference threshold voltage in the predetermined small section is lower than the reference threshold voltage in other sections.

4. A stepping motor control circuit according to claim 2, wherein the control unit immediately rotatably drives the stepping motor using the correction drive pulse when the induction signal in the predetermined small section does not exceed the reference threshold voltage in the small section.

5. A stepping motor control circuit according to claim 3, wherein the control unit immediately rotatably drives the stepping motor using the correction drive pulse when the induction signal in the predetermined small section does not exceed the reference threshold voltage in the small section.

6. A stepping motor control circuit according to claim 2, wherein the predetermined small section is a small section forming a front portion of the section in which the predetermined small section is included.

7. A stepping motor control circuit according to claim 3, wherein the predetermined small section is a small section forming a front portion of the section in which the predetermined small section is included.

8. A stepping motor control circuit according to claim 4, wherein the predetermined small section is a small section forming a front portion of the section in which the predetermined small section is included.

9. A stepping motor control circuit according to claim 5, wherein the predetermined small section is a small section forming a front portion of the section in which the predetermined small section is included.

10. A stepping motor control circuit according to claim 2, wherein the detection section is divided into a first section immediately after driving of the stepping motor using the main drive pulse, a second section which comes after the first section, and a third section which comes after the second section, and the predetermined small section is a section forming a front portion of the second section.

11. A stepping motor control circuit according to claim 3, wherein the detection section is divided into a first section immediately after driving of the stepping motor using the main drive pulse, a second section which comes after the first section, and a third section which comes after the second section, and the predetermined small section is a section forming a front portion of the second section.

12. A stepping motor control circuit according to claim 4, wherein the detection section is divided into a first section immediately after driving of the stepping motor using the main drive pulse, a second section which comes after the first section, and a third section which comes after the second section, and the predetermined small section is a section forming a front portion of the second section.

13. A stepping motor control circuit according to claim 5, wherein the detection section is divided into a first section immediately after driving of the stepping motor using the main drive pulse, a second section which comes after the first section, and a third section which comes after the second section, and the predetermined small section is a section forming a front portion of the second section.

14. A stepping motor control circuit according to claim 6, wherein the detection section is divided into a first section immediately after driving of the stepping motor using the main drive pulse, a second section which comes after the first section, and a third section which comes after the second section, and the predetermined small section is a section forming a front portion of the second section.

15. A stepping motor control circuit according to claim 7, wherein the detection section is divided into a first section immediately after driving of the stepping motor using the main drive pulse, a second section which comes after the first section, and a third section which comes after the second section, and the predetermined small section is a section forming a front portion of the second section.

16. A stepping motor control circuit according to claim 8, wherein the detection section is divided into a first section immediately after driving of the stepping motor using the main drive pulse, a second section which comes after the first section, and a third section which comes after the second section, and the predetermined small section is a section forming a front portion of the second section.

17. A stepping motor control circuit according to claim 9, wherein the detection section is divided into a first section immediately after driving of the stepping motor using the main drive pulse, a second section which comes after the first section, and a third section which comes after the second section, and the predetermined small section is a section forming a front portion of the second section.

18. An analog electronic timepiece comprising:

a stepping motor which rotatably drives a time hand; and a stepping motor control circuit which controls the stepping motor, wherein the stepping motor control circuit according to claim 1 is used as the stepping motor control circuit.

19. An analog electronic timepiece comprising:

a stepping motor which rotatably drives a time hand; and a stepping motor control circuit which controls the stepping motor, wherein the stepping motor control circuit according to claim 2 is used as the stepping motor control circuit.

20. An analog electronic timepiece comprising:

a stepping motor which rotatably drives a time hand; and a stepping motor control circuit which controls the stepping motor, wherein the stepping motor control circuit according to claim 3 is used as the stepping motor control circuit.

* * * * *